Sept. 1, 1970 L. GASSER 3,526,724
KEY-CONTROLLED TWO-FREQUENCY AF GENERATOR
Filed Jan. 23, 1967
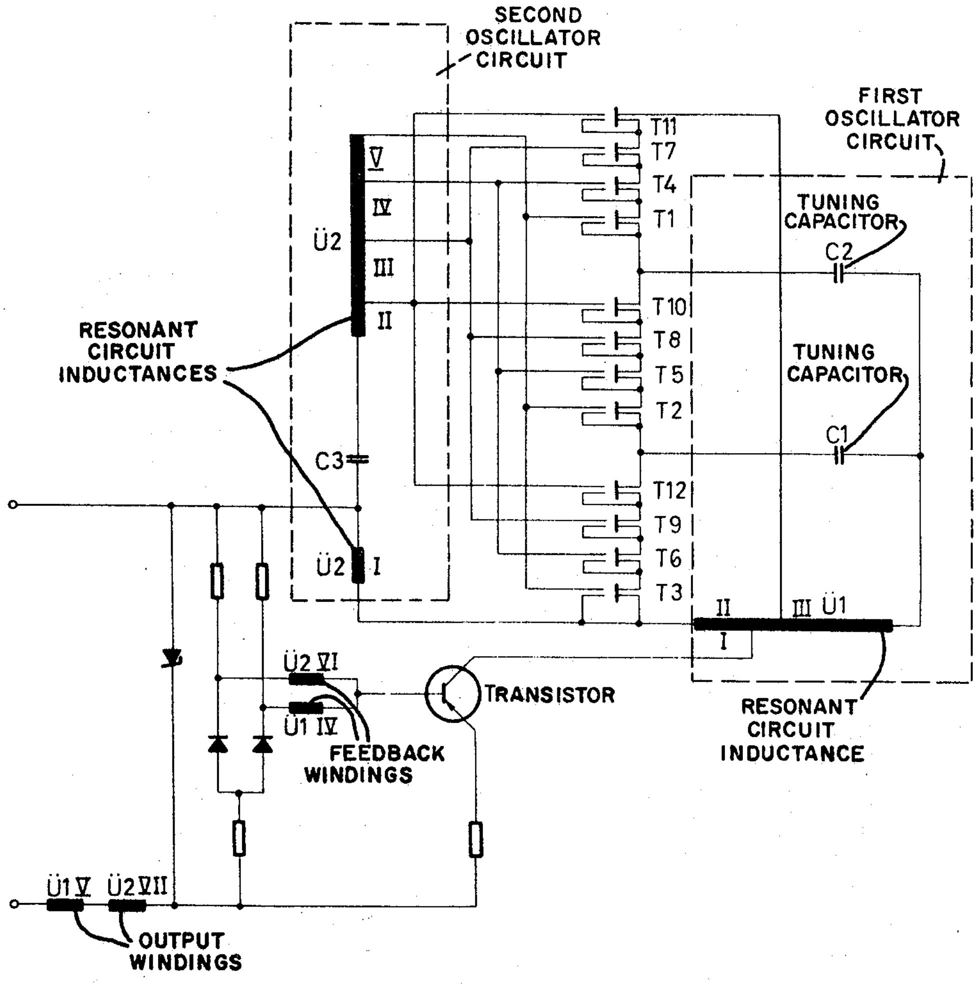

United States Patent Office 3,526,724
Patented Sept. 1, 1970

3,526,724
KEY-CONTROLLED TWO-FREQUENCY AF GENERATOR

Lorenz Gasser, Stuttgart, Germany, assignor to International Standard Electric Corporation
Filed Jan. 23, 1967, Ser. No. 610,984
Claims priority, application Germany, Jan. 28, 1966, St 24,918
Int. Cl. H04m *1/50*
U.S. Cl. 179—90 6 Claims

ABSTRACT OF THE DISCLOSURE

Key operated audio frequency system using a minimum of contacts to provide two tones per operated key plus safety from false signalling when keys are unintentionally operated. Two resonant circuits are provided for one active element. The frequency of one resonant circuit is determined by opening a break contact of a switch-over contact chain. The other circuit frequency is determined when the contact broken makes to select an inductive tap.

The invention relates to tone dialing systems and more particularly to key-controlled two-frequency AF generators in which key contacts are used to set two oscillating circuits simultaneously.

Such AF generators are used, for example, in the subscriber station of telephone systems for AF key dialing. The signals emitted by such a subscriber station are formed by two signal frequencies. The signals may be represented, for example, in the (2-out-of-5)-code or in the 2×(1-out-of-4)-code. In any case, two signal frequencies must be emitted at the same time.

A number of two-frequency AF generators are known, possessing two oscillating circuits and only one active element. When a dial key is actuated both oscillating circuits are tuned with the code signal, associated to the respective key. Consequently, both signal frequencies are determined. In most cases, a tuning capacitor is provided for each oscillating circuit, connected with the respective tapping of the resonant-circuit inductance. In general, the key has two separate contacts, which set both oscillating circuits independently of each other.

The connection of the oscillating circuits capacitors, however, shows the draw-back that, if two and more keys are actuated simultaneously, parts of the resonant-circuit inductance are shunted. For example, only one signal frequency can be transmitted. This fault is particularly troublesome, when the keys are unintendedly actuated, if a call connection is already established. In single frequency signal transmission routes, this can lead to undesired switching processes, particularly to a release of the connection.

It has been tried, therefore, to construct the key-controlled AF generator in a manner such that, even when actuating two or more keys simultaneously, always a signal with the predetermined number of signal frequencies is emitted. This is accomplished by increasing the number of key contacts. The tuning contacts of an oscillating circuit are formed as switch-over contacts, whereby the non-operative sides are series-connected and connected with the tuning capacitor, while the operative sides are connected with the respective tapping of the resonant-circuit inductance. Such a contact arrangement is necessary for each oscillating circuit.

It is the object of the invention to simplify the key-controlled two-frequency AF generator in such a way that it is reliable even with less key contacts and that two signal frequencies are emitted, even if two or more keys are actuated simultaneously.

According to the invention, the first oscillator circuit is tuned with the aid of various tuning capacitors and the second oscillator circuit is tuned with the aid of various tapping of the resonant-circuit inductance. The tuning is performed in the first oscillating circuit by a break-contact and in the second oscillating circuit by a make-contact of the dial keys. With this type of tuning the desired safety can be achieved with only one switch-over contact per key. The generator circuit is thereby switched on in such a way that a switch-over contact with separate break-contact and make-contact is provided per dial key. The inactive sides of these contacts are series-connected, to shunt a portion of the first resonant circuit inductance and simultaneously connect tuning capacitors that were previously preparatorily connected to this contact chain. The make contacts connect a tuning capacitor for the second oscillating circuit with the associated tapping of the second resonant-circuit inductance. Thereby, the first oscillating circuit is made independent of the switching of keys even in the non-operative position.

For a group code like for the code 2×(1-out-of-4), it is of advantage, if the break-contact chain is also subdivided into groups and if various tuning capacitors are connected between the contact groups and are directly connected with the other terminal to the resonant-circuit inductance.

According to the invention, both oscillating circuits are series-connected via partial windings of their resonant circuit inductances in the output circuit of a transistor. The remaining windings of the second resonant-circuit inductance are then connected with the associated winding in the output circuit of the transistor via a tuning capacitor.

But, it is also possible to associate a separate active element to each oscillating circuit. Nothing is thereby changed, however, at the tuning circuit of both oscillating circuits.

In order to prevent shunting a portion of the winding of the second oscillating circuit when two and more keys are actuated, the invention provides, that the make-contacts and the break-contacts are connected to a switch-over chain.

The invention will now be explained in detail with the aid of an example shown on the accompanying drawing.

The two winding I of the resonant-circuit inductances U1 and U2 are series-connected in the output circuit of a transistor T*r*. The windings U2 VI and U1 IV in the control circuit are the feedback windings and the windings U1 V and U2 VII are the output windings.

The tuning circuit may be explained with the aid of a two-group code. The first oscillating circuit, formed by the tuning capacitors C1 and C2 and the resonant-circuit inductance U1 is tuned via the break-contacts of keys T1 to T12. These contacts form three groups with the contacts T3, T6, T9, T12 and T2, T5, T8, T10 and T1, T4, T7, T11. All contacts still form a closed chain across which the winding II of the resonant circuit inductance U1 is shunted. This oscillating circuit cannot be started in the non-operative position.

When actuating an arbitrary key this shunt circuit is cancelled and one of the three signal frequencies is set. If a contact of the group T3, T6, T9, T12 is open both tuning capacitors C1 and C2 are in parallel to the tuning winding III of the resonant-circuit inductance U1. If, on the other stand, a contact of the group T2, T5, T8, T10 is opened the capacitor C1 is in parallel to the winding II and III, while capacitor C2 is in parallel to winding III. And finally, if a contact of the group T1, T4, T7, T11 is actuated, both capacitors C1 and C2 are in parallel to the windings II and III. In this way three different signal frequencies are set.

If contacts from two different groups are actuated, the oscillating circuit remains set to one frequency which may deviate from the three signal frequencies mentioned. But, it is only important that each oscillating circuit renders a frequency.

The second oscillating circuit is tuned by connecting a single tuning capacitor C3 to different windings II, III, IV, and V of the resonant-circuit inductance U2. In this manner, four signal frequencies can be set which differ from the three signal frequencies of the first oscillating circuit.

The make-contacts of keys T1 to T12 perform this connection. In the group code each signal frequency of the second oscillating circuit participates one in each of the contact groups T3, T6, T9, T12 or T2, T5, T8, T10 and T1, T4, T7, T11, as the leads indicate leading to the windings II, III, IV and V of the resonant-circuit inductance U2.

The switch-over contacts of the keys are shown in the example as separate break and make contacts as realized, for example, through a ball-type armature contact with engaging characteristic, known to the art. The separate make contacts are thereby connected with the chain of the break contacts forming a switch-over contact chain known per se. It is thereby achieved that, when actuating two and more keys, no partial winding II, III, IV or V can be shunted in the second oscillating circuit by a key or contact other than the first operating key or contact in the chain. Only the connection at the outset of the chain (i.e., the first operating contact in the chain) in the second oscillating circuit becomes effective.

The tuning circuit shown in the example is not to be considered as a limitation of the invention. The number of tuning capacitors in the first oscillating circuit depends on the signal code selected. The groups can also be selected in another arrangement.

While the principles of the invention have been described above in connection with specific apparatus and applications, it is to be understood that this description is made only by way of example and not as a limitation on the scope of the invention.

I claim:

1. A key-controlled single active element audio frequency generator, said generator having first and second oscillator circuits, key contact means for simultaneously tuning said first and second oscillating circuits, said key contact means comprising switch over contacts having separate make and break contact pairs, said break contact pairs arranged in a contact chain, said first oscillating circuit comprising first inductance means and first capacitance means connected to bridge said first inductance means by said contact chain in the non-operated condition, said second oscillating circuit comprising second inductance means and second capacitance means, means including at least one of said make contact pairs for connecting said second capacitance means to bridge said first capacitance means, means responsive to the operation of any of said keys for opening one of said break contacts to vary the resonant frequency point of said first oscillator circuit by varying either the said first capacitance means, said first inductance means or both said first capacitance means and said first inductance means, and make contact means responsive to the operation of the same of any of said keys for varying the resonant frequency of said second oscillator by varying the said second inductance means.

2. The key controlled generator of claim 1 wherein said first inductance means comprises at least two serially connected windings, means for connecting said chain of contacts in the non-operated condition for shunting one of said serially connected windings.

3. The key controlled generator of claim 2 wherein said first capacitance means comprises a first and a second comparator, and means including said chain of contacts in the non-operated condition for parallel connecting said first and second capacitor across said non-shunted coil.

4. The key controlled generator of claim 3 wherein said contact chain is subdivided into serially connected groups of contacts, means for connecting said first capacitor between the junction of said first and second group, and an end of said inductance means, means for connecting said second capacitor between the junction of said second and third group and the said end of said inductance means, means for connecting the beginning of said first group to the other end of said inductance means, and means for connecting the last contact of said last group to a junction of said coils.

5. The key controlled generator of claim 6 wherein said inductance means comprises a plurality of serially connected coils, taps at the junction of said coils, and means including said make contact pairs for connecting said second capacitance means to select ones of said tap to vary the resonant frequency of said second oscillating circuit.

6. The key controlled generator of claim 1 wherein both oscillating circuits are series-connected in the output circuit of said active element via partial windings of the first and second inductance means.

References Cited

UNITED STATES PATENTS

| | | | |
|---|---|---|---|
| 3,184,554 | 5/1965 | Meacham et al. | 179—84 |
| 3,284,577 | 11/1966 | Burns et al. | 179—84 |
| 3,351,715 | 11/1967 | Gasser | 179—84 |

KATHLEEN H. CLAFFEY, Primary Examiner

J. S. BLACK, Assistant Examiner